United States Patent Office 2,755,316
Patented July 17, 1956

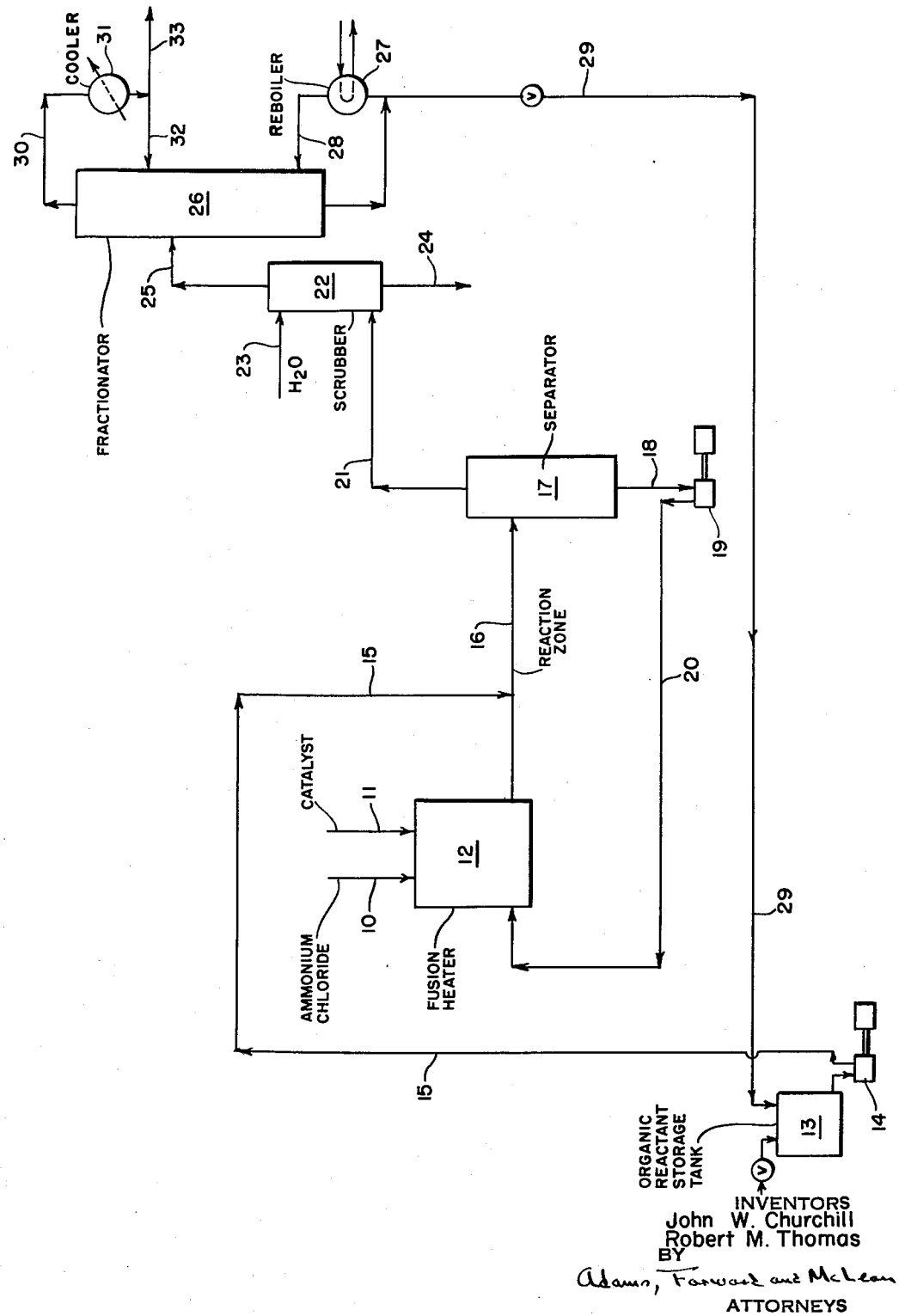

2,755,316

REACTION OF ORGANIC COMPOUNDS WITH AMMONIUM CHLORIDE

John W. Churchill, Kenmore, and Robert M. Thomas, Niagara Falls, N. Y., assignors to Olin Mathieson Chemical Corporation, a corporation of Virginia Application December 29, 1951, Serial No. 264,134

8 Claims. (Cl. 260—657)

Our invention relates to the manufacture of organic chlorides from ammonium chloride and acetylene or organic oxygen, sulfur and nitrogen bearing compounds. In particular, our invention relates to a method of handling and contacting ammonium chloride with reactive organic compounds in a fused catalytic reaction system.

In our copending applications, Serial No. 243,345, filed August 23, 1951, and Serial No. 243,346, filed August 23, 1951, we disclosed that organic compounds containing a reactive oxygen, sulfur or nitrogen group such as an alcohol, ether, aldehyde, ester or a sulfur or nitrogen analogue thereof react with ammonium halides (but not with ammonium iodide) at about 250° to 500° C. in the presence of a dehydrochlorination type catalyst of acidic to mildly alkaline character to form corresponding organic halides. The reaction with alcohols, particularly methanol and ethanol to produce methyl and ethyl chlorides respectively is preferred. Alumina is the most effective catalyst but various activated earths and silicates, and metal halides are also effective. Temperatures of 250° to 500° C. are employed and contact time is inversely correlated with temperature. A short contact time is desired at high temperature and is obtained by control of the space velocity of the reactants. Following the reaction, the vapor passes through a recovery system usually comprising scrubbing, cooling, condensing, and distillation to fractionate the reaction mixture and recover the organic halide and ammonia.

Pending application, Serial No. 243,344, filed August 23, 1951, of John W. Churchill discloses that acetylene reacts with ammonia chloride at about 250° to 500° C. in the presence of a hydrochlorination type catalyst at atmospheric pressure to form vinyl chloride. The reaction is preferably conducted at about 250° to 350° C. An excess of acetylene is used, proportions of acetylene to ammonium chloride ranging from 2:1 to 5:1. Mercury is an effective catalyst, as are chlorides of lead, bismuth, barium, magnesium, vanadium, aluminum, zinc, and iron.

The desired reaction of ammonium chloride with organic substances to produce organic chlorides occurs at high temperatures, in the range of 250° to 500° C. At this reaction temperature, it is necessary for effective conversion that the ammonium chloride and organic reactant be in the vapor state. The vaporization of ammonium chloride, however, presents many difficult problems. An extraordinarily large heat input is required to vaporize ammonium chloride. About 39.6 kilocalories is required to vaporize one gram mole of ammonium chloride at 350° C. This required heat input includes not only the heat of vaporization but also the heat of dissociation of the acid and base components of ammonium chloride. Moreover the problem of vaporization is aggravated by the requirement that the heat must be supplied at a high temperature level to maintain the desired reaction conditions, by the tendency of ammonium chloride to sinter upon heating, by its corrosiveness and by its poor heat transfer characteristics. Its tendency to sublime further contributes to the problem of vapor phase handling since sufficient heat must be supplied to the ammonium chloride to maintain it at all times above the sublimation point in order to prevent recondensation on the first cool surface contacted. The transition from solid state to vapor state interferes with any superheat operation. Moreover, when solid ammonium chloride is contacted with a hot heat transfer surface, the small portion of the ammonium chloride in contact with the hot surface sublimes and shrinks away from the surface so that the bulk of the solid ammonium chloride is caked in a shape that has minimum contact with the heat transfer surface and thus the problem of heating and handling the mass is further aggravated. The vaporized ammonium chloride forms a film which effectively insulates the bulk of solid ammonium chloride from the heat transfer surface preventing effective vaporization of the remaining solid. Severe corrosion problems are encountered when ammonium chloride is vaporized in an external heater and then introduced into a reactor as the vaporized ammonium chloride is highly corrosive. Moreover, when vapors of the organic reactant are contacted with solid ammonium chloride in a manner promoting the reaction, the ammonium chloride crystals stick together to form lumps and the entire bed sinters, resulting in poor conversion.

We have found that certain metal halide catalysts in the fused state provide a catalytic reaction medium in which solid ammonium chloride may be dissolved and effectively reacted by contacting with the organic reactant thereby avoiding the difficulties involved in heating and vaporizing ammonium chloride in bulk and obtaining efficient contact of ammonium chloride with the organic reactant.

According to our invention we form a fusion of ammonium chloride with a metal halide catalyst, the metal being selected from groups I and II of the periodic table and the halogen having an atomic number between 9 and 35 inclusive, and maintain the fused mixture at a temperature of about 250° to 500° C. The organic reactant, for example, alcohol, in vapor or liquid form is passed into the fused mixture. It reacts with the ammonium chloride to form the corresponding organic chloride and the vapor products are taken off.

Our invention effectively avoids the problem of caking and the insulating effect that occurs when ammonium chloride is heated in bulk and minimizes the problem of corrosiveness as there is a minimum of unreacted ammonium chloride in the corrosive vapor state. Moreover, in view of the fact that the fused metal halide catalyst advantageously provides a reaction medium, in addition to a convenient heat transfer medium, the heat of reaction helps to maintain the fused mixture at the desired reaction temperature thereby resulting in a considerable heat saving.

The catalysts that are suitable for the purpose of our invention are metal halides, in which the metals are selected from groups I and II of the periodic table and are preferably in their lower valence state. Suitable halogens have atomic numbers 9 to 35 inclusive. Examples of suitable metal halides are cuprous chloride, zinc chloride, sodium chloride, and potassium chloride. Metal bromides and fluorides are also useful. These catalysts may be supplemented with other catalysts, such as alumina, by admixing them with the metal halide catalysts or by using the other catalysts in a separate stage following the fused catalytic reaction stage.

From about sixty per cent or up to 99 per cent or more of the fused mixture may be catalyst, the remainder consisting of ammonium chloride. The percentage of the latter may be chosen to maintain the proper ratio of reactants. The mixture is maintained in the fused state by suitable heating means such as heating with hot producer gas, high pressure steam or electrical means.

Although the operation may be controlled so that substantially all the reaction occurs in a single zone, it is advantageous to provide a subsequent separate reaction zone to provide adequate time of reaction to complete the reaction. In this two-stage operation, vapor products are removed from the first stage fused catalytic system and passed through a second stage reaction zone containing a suitable catalyst of the type described in copending application Serial No. 243,345 identified above. The catalyst in the second stage is preferably alumina and may be handled in the form of a fixed bed, a fluidized bed or a moving compact bed in pill form.

The organic reactant is introduced preferably in the vapor stage and sufficiently heated so as not to lower the temperature of the fused mixture below the desired reaction temperature of 250° to 500° C. The organic reactant vapor may be diluted with an inert carrier, particularly when the organic reactant is a high-boiling substance, which also aids in the removal of the vapor products from the fused system. Liquid organic reactants may also be added directly to the fused mixture.

The process is ordinarily operated at atmospheric pressure but may be operated at reduced or elevated pressure. However, it is particularly advantageous to operate under such conditions that the organic reactant and reaction products are vaporized at the reaction temperature. To some extent, the capacity of any particular equipment may be increased by the use of elevated pressures. The use of pressures sufficiently low to cause sublimation of ammonium chloride, particularly below the preferred reaction temperatures, is undesirable in our process.

The reaction of the ammonium chloride in the fused mixture with the organic reactant may be carried out in several ways. In the preferred method, vapors of the organic reactant, for example, alcohol, are passed into a body of the fused mixture until the proportion of ammonium chloride is too low to obtain a satisfactory degree of conversion. Ammonium chloride may be added to make the operation continuous. Alternatively, vapors of the organic reactant and the fused mixture are contacted countercurrently in a reaction tower.

In another method of conducting our invention, the fused mixture is continuously circulated through a heated pipe system. The organic reactant, as vapor or liquid, is continuously injected into the fused mixture in a reaction zone and the gaseous product separated from the fused medium in a separating zone. Suitably, the separated fused catalyst is returned to the circulating fused mixture. The separated vapors may pass to a fractionating column where the organic chloride is separated, residual organic compound and by-products being returned to the fused mixture while the organic chloride is taken overhead. To make the reaction more complete, the separated vapors may pass to a separate reaction zone to provide adequate time of reaction and to complete the reaction and then to a recovery system.

The products may be accumulated and purified by batch methods. Continuous separation and purification of the products and return of by-product ether and amines, in the case of lower alcohol charging materials, and unreacted organic materials to the system is preferred. It is advisable to modify the detail of the recovery procedure in each instance according to the physical properties of the organic reactant charged and the properties and concentration of the product. For example, when ethanol is the organic reactant, fractional distillation is probably the most economical method for recovery of ethyl chloride whereas a multi-stage extraction procedure may be more economical in the recovery of methyl chloride. In the case of methyl chloride, the reaction mixture usually comprises a mixture of methyl chloride, ammonia, small amounts of lower amines and ether, water vapor and unreacted ammonium chloride. Water scrubbing will remove in solution the ammonia, ammonium chloride, the amines and a small amount of ether. This mixture may be worked up by distillation. The unabsorbed vapors comprising methyl chloride contaminated with small amounts of ether and saturated with water vapor advantageously are contacted in a second scrubbing tower with strong sulfuric acid. The ether and water vapor are absorbed by the sulfuric acid and the dried methyl chloride is recovered by condensation. The ether may be separated from the sulfuric acid by heating for disposal as by-products or for recycle. The sulfuric acid is reconcentrated occasionally as necessary.

The process of our invention is particularly applicable to the reaction of ammonium chloride with lower aliphatic alcohols. For example, our process has special advantages in the preparation of methyl chloride and ethyl chloride from ammonium chloride and methanol and ethanol respectively. Other aliphatic alcohols which may be used as organic reactants in our process are isopropanol, isoamyl alcohol, lauryl alcohol and other higher aliphatic alcohols. Cycloaliphatic alcohols, for example cyclohexanol, and aromatic substituted alcohols such as benzhydrol may also be used.

The operation of our invention will be further illustrated by reference to the accompanying drawing which is a schematic flow plan illustrating a method of continuous operation.

In the operation of the drawing, the catalyst, for example cuprous chloride, is charged by line 11 into a fusion heater 12. The ammonium chloride is charged by line 10 into fusion heater 12. The mixture is heated to maintain it in a fused condition.

The fused mixture is transferred from fusion heater 12 via line 16 to separator 17. Organic reactant, for example alcohol, from storage tank 13 is injected into line 16 near the heater exit via line 15 and pump 14. The reaction is very rapid and occurs in the transfer line 16 between the point of injection of the organic reactant and separator 17. If desired, a vaporizer (not shown) may be inserted in line 15 in order to inject organic reactant vapor rather than liquid into the fused mixture.

In the separator 17 the fused catalyst is separated from the reaction products, is continuously removed from the separator 17 by line 18 and returned to the fusion heater 12 via line 20 and pump 19. Suitable heating means are provided for the transfer lines to maintain the catalyst in the fused state. The vapor from separator 17 containing organic chloride, ammonia, water, and unreacted organic reactant with small amounts of ammonium chloride is removed by line 21 to scrubber 22. The vapor from separator 17 may be passed to a second reaction zone (not shown) where it is contacted with a suitable catalyst, for example alumina, in the form of a fixed bed, fluidized bed or a moving compact bed in pill form to complete the reaction.

Water is introduced to the top of scrubber 22 through line 23 in order to remove ammonia, ammonium chloride carry-over and water-soluble materials such as lower amines and some lower ethers in the case of lower alcohol charging materials. The water solution is removed from the bottom of scrubber 22 through line 24 and is separately processed by distillation to recover ammonia and to fractionate the remaining water-soluble materials for recycle or as by-products.

The unabsorbed vapor stream from scrubber 22 passes by line 25 to fractionator 26 in which separation of the organic chloride is effected. A part of the liquid bottoms may be passed through reboiler 27 and pumped via line 28 to the bottom of fractionator 26 to supply heat while the excess is returned through line 29 to the organic reactant storage tank 13 for recycle. The organic chloride product is taken overhead through line 30 and through cooler 31. Part of the stream returns through line 32 to the top of fractionator 26 as refluxed and the product is removed via line 33.

The process of our invention will be further illustrated by reference to the following examples.

Example I

A fusion of 6977 parts of cuprous chloride and 2304 parts of ammonium chloride was maintained at 320–325° C. for 92 minutes during which time 75.5 parts of ethanol vapors was introduced. Ethyl chloride was produced at the rate of about 0.1 pound per hour per cubic foot of catalyst.

Example II

A fusion of 5500 parts of cuprous chloride, 1800 parts of ammonium chloride and 59 parts of zinc chloride was maintained at 335–347° C. while ethanol vapor was introduced at the rate of 5.9 parts per minute. About 9.1% of the ethanol was converted to ethyl chloride.

Example III

A fusion of 3430 parts of zinc chloride and 1337 parts of ammonium chloride was maintained at 315–324° C. while ethanol vapor was passed through the catalyst at the rate of 38.5 parts per hour. Exit gases were condensed and fractionated to obtain about 4.85 parts per hour of ethyl chloride.

Example IV

Ethanol vapor was passed through a fused catalyst mixture of 3430 parts of zinc chloride, 1337 parts of ammonium chloride and 60 parts of alumina maintained at 345–355° C. The resulting ethyl chloride was fractionated from the condensed exit gases.

We claim:

1. In the process of producing organic chlorides by the reaction of ammonium chloride with an organic compound reactive therewith to form an organic chloride at an elevated temperature and in the presence of a catalyst effective to promote the reaction, the method which comprises forming a fusion of ammonium chloride and a metal halide in which the metal is selected from the elements of groups I and II of the periodic table and the halogen has an atomic number between 9 and 35 inclusive, contacting the fused mixture with the reactive organic compound in a reaction zone at a temperature of 250° to 500° C. and removing reaction vapors from the reaction zone.

2. The method of claim 1 in which the catalyst is a metal chloride.

3. The method of claim 1 in which the catalyst is cuprous chloride.

4. The method of claim 1 in which the reactive organic compounds is a lower aliphatic alcohol.

5. In the process of producing organic chlorides by the reaction of ammonium chloride with an organic compound reactive therewith to form an organic chloride at an elevated temperature and in the presence of a catalyst effective to promote the reaction, the method which comprises forming a fusion of ammonium chloride and a metal halide in which the metal is selected from the elements of groups I and II of the periodic table and the halogen has an atomic number between 9 and 35 inclusive, contacting the fused mixture with the reactive organic compound in a reaction zone at a temperature of 250° to 500° C., removing the reaction vapors containing a mixture of ammonium chloride dissociation products and reactive organic compound to an additional reaction zone and reacting the mixture in the presence of a catalyst in the additional reaction zone at a temperature of about 250° to 500° C.

6. In the process of producing organic chlorides by the reaction of ammonium chloride with a lower aliphatic alcohol at an elevated temperature and in the presence of alumina catalyst, the method which comprises forming a fusion of ammonium chloride and a metal chloride selected from the group consisting of cuprous chloride and zinc chloride, contacting the fused mixture with the lower aliphatic alcohol in a reaction zone at a temperature of 250° to 500° C., and removing reaction vapors from the reaction zone.

7. The method of claim 6 in which the metal halide is cuprous chloride.

8. The method of claim 6 in which the alcohol is ethanol.

References Cited in the file of this patent

UNITED STATES PATENTS

| Number | Name | Date |
|---|---|---|
| 1,812,542 | Nieuwland | June 30, 1931 |
| 2,328,430 | Dornte | Aug. 31, 1943 |
| 2,407,828 | Gorin | Sept. 17, 1946 |

FOREIGN PATENTS

| Number | Country | Date |
|---|---|---|
| 452,934 | Great Britain | Sept. 2, 1936 |
| 686,849 | Germany | Jan. 17, 1940 |
| 704,759 | Germany | Apr. 7, 1941 |

OTHER REFERENCES

Mellor: "Comprehensive Treatise on Inorganic and Theoretical Chemistry," vol. 11, pp. 566–9, 573–4 (1922).

Rodebush et al.: "Jour. Am. Chem. Soc.," vol. 51, pp. 748–59 (1929).

"Chem. Abstracts," vol. 28, p. 7539 (1934), Abstract of article by Porai-Koshitz.

Stephenson: "Jour. Chem. Phys.," vol. 12, pp. 318–9 (1944).

Pray et al.: "Jour. Am. Chem. Soc.," vol. 70, pp. 433–4 (1948).